INVENTORS
Bohuslav Loun, Miloslav Martinek,
Josef Sob, Ivan Zelinka
By Richard ...

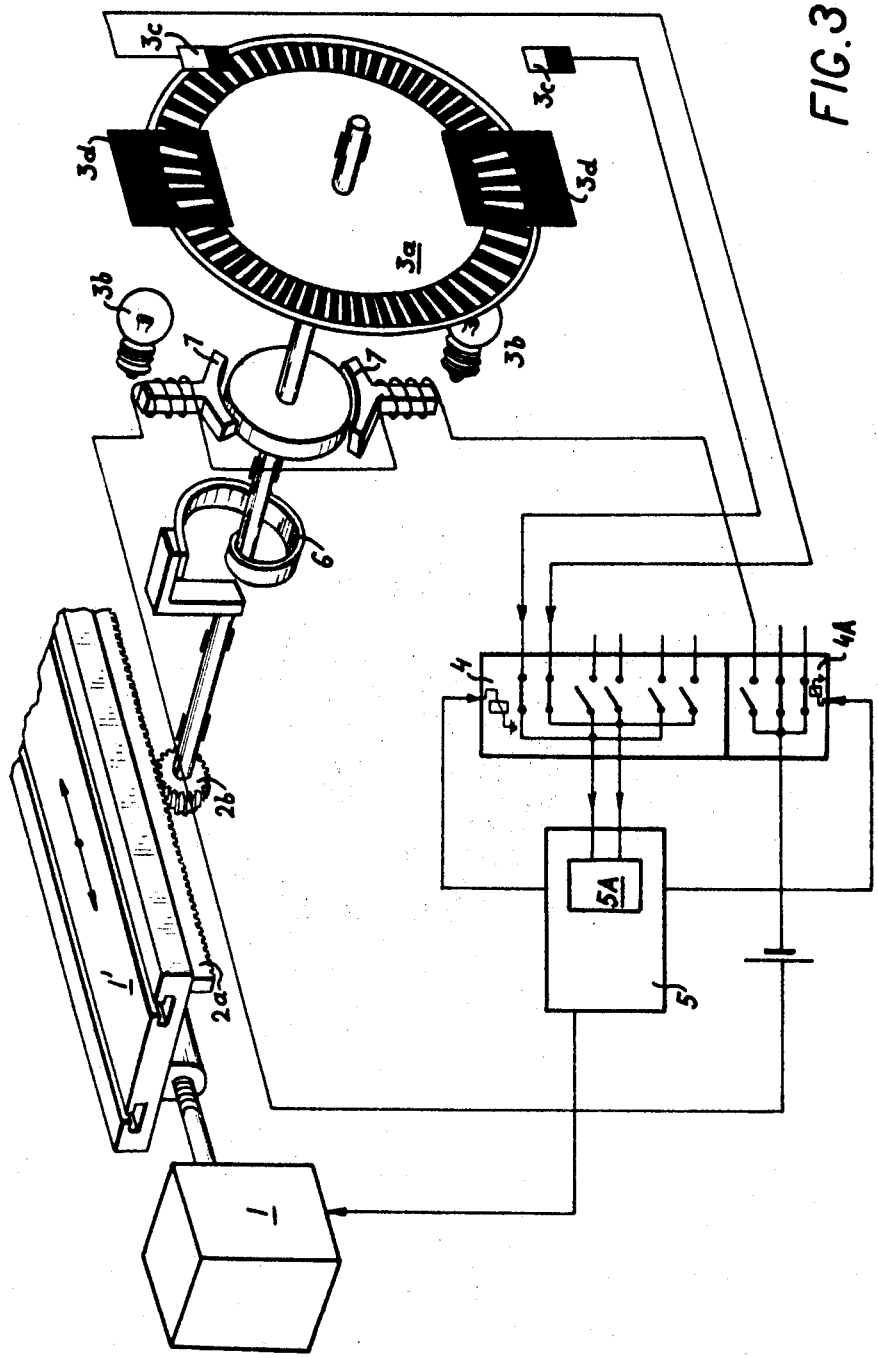

United States Patent Office 3,402,284
Patented Sept. 17, 1968

3,402,284
DEVICE FOR CONTINUOUS DIGITAL INCREMENTAL CONTROL OF THE RELATIVE POSITION OF MOVING PARTS
Bohuslav Loun, Miloslav Martínek, Josef Šob, and Ivan Zelinka, Prague, Czechoslovakia, assignors to Výzkumný ústav matematických strojů, Prague, Czechoslovakia
Filed June 30, 1964, Ser. No. 379,315
Claims priority, application Czechoslovakia, July 26, 1963, 4,303/63
8 Claims. (Cl. 235—151.11)

ABSTRACT OF THE DISCLOSURE

An energy storage device is coupled to and responsive to a moving machine part. A brake is coupled between the storage device and the input of the signal transmitter of a control system. The brake includes a brake control connected to and controlled by the control of the control system for selectively energizing the brake to block the transfer of energy from the energy storage device to the signal transmitter so that movement of the machine part causes a corresponding accumulation of energy in the energy storage device and deenergizing the brake to permit the transfer of energy from the energy storage device to the signal transmitter so that movement of the machine part causes a corresponding movement of the signal transmitter and the transfer to the signal transmitter of energy accumulated in the energy storage device.

---

The invention relates to a device for continuous digital incremental control of the relative position of moving parts, ordered by a control system. More particularly, the invention relates to an intermittent sequential control in at least two axes of movemet in digitally controlled machine-tools.

In the case of intermittent digital control of the moving parts of machines in an automatic process with the relative (incremental) method of measuring, for example, setting of the axes in the case of machine-tools, rectangular control of milling machines, and the like, transmitters of control signals are used in each axis as the device for measuring the length of the shift of controlled moving parts in the various coordinate axes of the feed or advance. Each transmitter possesses a mechanical input coupled with the movements of the machine part of the respective feed axis, and an output of electric signals supplied to the control unit proper of the automatic control system.

Due to the fact that sequential control of the device in two or more axes of the feed is required, it is possible and most convenient from the economical point of view to employ a single common control unit. The input of this common control unit is intermittently fed from the outputs of the transmitters of the control signals of the respective moving parts in a programmed time sequence.

Several systems have already been proposed to meet the above mentioned requirements. The known state of art in this field is, however, attended with several drawbacks which will be explained in more detail below. It is therefore a general object of the invention to eliminate the drawbacks of the known state of art.

Stated briefly, the specific object of the invention is a device of the type stated in the introductory paragraph of this specification, characterized by the fact that into the mechanical coupling between the mechanical input proper the transmitter of control signals there is interposed for each axis of movement an "accumulator" and a braking member. The accumulator and brake are controlled from the operational unit of the control system where after the transmitter of the control signals of one axis of movement, through a change-over circuit and by means of the braking member there is locked the position of the transmitter of the control signals of the same axis of movement. At the same time, the coupling in the accumulator is released, so that any further informations reaching the mechanical input are stored in the accumulator. After renewed disengagement of the braking member and restoration of the coupling in the accumulator, the stored informations are sent to the transmitter of the control signals, and hence, through the reengaged change-over system, the informations reach the control system where they are evaluated.

The invention will be best understood from the following specification to be read in conjunction with the accompanying drawings, in which:

FIG. 3 is a schematic diagram of the control system of the invention.

Figure 1:
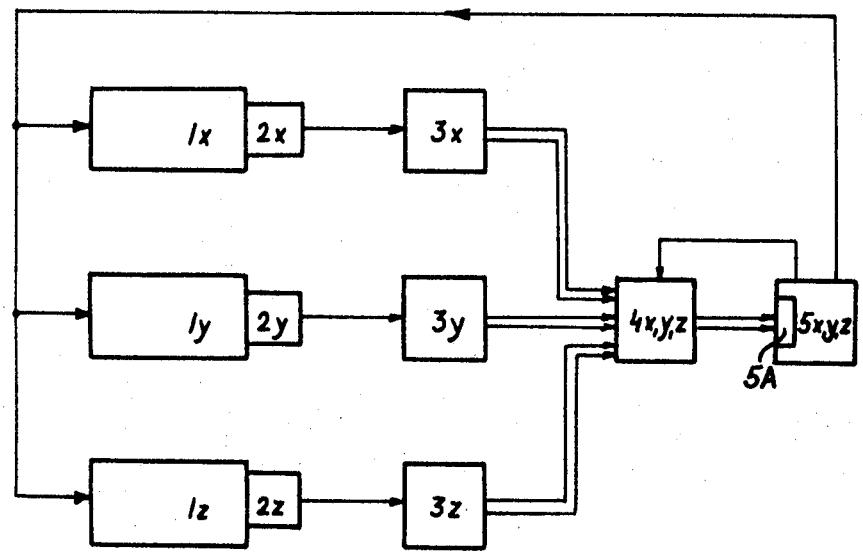
FIG. 1 is a block diagram of a known machine tool control system.

Referring now more particularly to FIG. 1, which illustrates systematically such a system with three controlled moving parts, the notation is:

$1x$, $1y$, $1z$—drive unit for the feed axes X, Y, Z, $2x$, $2y$, $2z$—mechanical inputs of the transmitters of the control signals in the axes X, Y, Z, $3x$, $3y$, $3z$—transmitters of the control signals for the axes X, Y, Z, $4x$, $y$, $z$—change-over unit which, in accordance with input instructions, connect the transmitter of the control signals of the respective feed axis, $5x$, $y$, $z$—control unit proper with the circuit for determining the direction 5A.

The instructions about selecting the feed axis, the direction and the speed of the feed, and a digital instruction about the required length of the path expressed by the number of element increments are stored in the control unit $5xyz$. The control unit issues a command or order to the drive unit $1x$, or $1y$, or $1z$ to move over the selected feed axis in the selected direction and at the selected speed. The drive unit 1 may comprise any suitable motor unit such as, for example, a hydraulic motor driven by a pulse-energized electric step motor. As soon as the movable part of the machine begins to move in the selected axis and direction, the mechanical input $2x$, or $2y$, or $2z$ begins also to move, and the respective signal transmitter or pulse generator begins to transmit signals over two paths, these signals having a phase shift with respect to each other. A phase shift of 90° of the fundamental (measured) wave length of the scale has been adopted to distinguish the direction of movement of the machine part in the given axis from the mutual phase sequence of the electric signals produced while the movable part of the machine is moving in the selected axis and directions.

Both output paths from the transmitters $3x$, or $3y$, or $3z$ are fed into the change-over unit $4x$, $y$, $z$ where the pair of output paths belonging to the transmitter $3x$, or $3y$, or $3z$ of the feed axis just selected is connected to the input into the control unit $5x$, $y$, $z$. A circuit connection in the change-over unit $4xyz$ is also controlled by the control unit in accordance with the input instructions.

The functional part of the "circuit for determining the direction" 5A is placed in the input of the control unit $5xyz$ with such a logical structure that if the movement of the machine part is effected by action of the drive unit $1x$, or $1y$, or $1z$ in the prescribed axis and in the direction prescribed by the control unit, the functional part of the circuit 5A transmits pulses over its output of decrements "with a positive meaning." If the machine part moves in the unwanted direction in the respective feed axis, however, it transmits pulses oved its output decrements "with a negative meaning." Decrements "with a positive meaning" cause the machine part to approach, and a decrement "with a negaaive meaning" causes it to move away from, the final point of the given section represented by the digital state of the registers of the control unit 5xyz. This summation of the input pulses in the registers of the control unit 5xyz with respect to the positive or negative meaning of the increments is equivalent to adding up or subtracting pulses in registers. The summation is carried out to ensure correct correspondence between the state of the registers and the actual change of the position of the controlled part in the given work section in case of vibration of the controlled machine part. As soon as the prescribed number of increments has been reached, the control unit 5xyz transmits to block 1x, or 1y, or 1z an order to stop the movement, and transmits to block 4xyz an order to disconnect the transmitter of the control signals. At the same time, instructions are changed in the control unit 5xyz, and the process is repeated.

In the above described process, the following facts should be noted:

(a) During the time in which the control unit 5xyz treats the signals from the connected transmitter (for example x), the other transmitters (for example y, z) are disconnected and the movable part in the axes of movement associated therewith is not supervised. If the movable part of the machine then moves spontaneonsly in the direction of some of the non-supervised axes, its movement is not registered. Consequently, after the non-supervised axis is again included in the control, the controlled movement in this axis of movement does not start from the assumed position of the machine part. Instead, it starts from a place to which the machine part has been moved in this axis under action of some external interference effect. This error may be continually accumulated and it may result, besides other undesirable effects, in an undesirable shift of the starting point when working over a closed path, and this requires particular attention if the same operation is repeated several times. Spontaneous movement of the machine tool or part in the non-supervised axis may be caused by vibration of the machine, insufficient self-locking, or by cutting forces affecting the non-supervised axis which displace the machine part in this axis within the limits of mechanical play in the drives, and the like.

(b) The speed of the movement of the machine part in the controlled axis before termination of the feed through the required length, selection of the elementary measured length and the time constant of the control elements controlling the stopping of the movable machine part (relays, contactors, clutches and couplings, and the like) must be selected so that beginning from the moment at which the order is issued from the control part, the machine should be stopped before the transmitter of control signals reaches a position corresponding to a further elementary increase. The time constant of the control elements is usually given by design factors of the employed elements and it can therefore not be affected. It is also necessary to limit the plays in the machine so that even the cutting forces cannot displace the machine parts in the non-supervised axis (axes) through a distance or length exceeding the value of an elementary feed. It follows from the above facts that the mechanical adjustment and the maintenance of the machine are more exacting. It is also necessary with regard to the given time constant to select both the minimal measured elementary path, and the maximal terminating feed so as to meet the above requirement. The above facts limit substantially the extent to which the described type of automatic control may be used, it reduces its economic value and increases the requirements for adjustment and maintenance of the machine.

The above mentioned drawbacks could be eliminated only by electronic means, namely by providing each axis of movement with its own auxiliary storage and with associated change-over circuits. But such a solution would be rather exacting both from the technical and material point of view. The costs for building such a system would be practically prohibiting in comparison with the costs required by the complete remaining control ssytem.

It is the general object of the invention to provide a system which is free of the above mentioned, drawbacks. It has already been briefly stated that in accordance with the invention a mechanical accumulator, mechanical energy storing device or spring and a braking member are arranged for each axis of movements in the mechanical coupling between the mehcanical input an dthe transmitter of the control signals. The accumulator and braking member are controlled by the operational unit of the control system. At the moment that the transmitter of the control signals of the respective axis of movement is disconnected by action of the change-over circuit, which is connected in common to all axes, the position of the transmitter of the control signals of this axis is secured or locked by the braking member, and at the same time the input of the accumulator is opened. Any further infromation supplied to the mechanical input is then stored in the accumulator. After again releasing the braking member and after reading the data of the accumulator (reinforcement of the coupling), the accumulated information is transferred to the transmitter of the control signals and hence via the renewed connection in the change-over circuit to the control system. In the control system, they correct the preselected value of the required length of the following section by a value proportional to the extent of the spontaneous movement occurring during the time that the accumulator of the respective axis of movemen has been disconneced.

Figure 2:
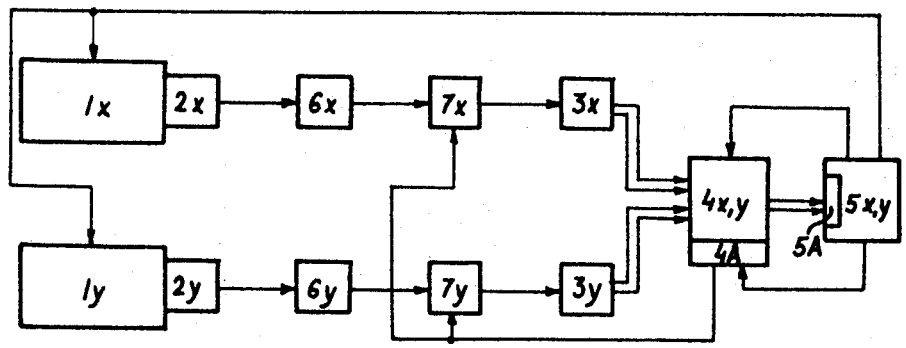
FIG. 2 is a block diagram of the control system of the present invention.

FIG. 2 illustrates the control system of the present invention for two axes of movement. In FIG. 2, the reference numerals 1, 2, 3, 4, 5 with the corresponding indices agree with the reference numerals in FIG. 1 with the only difference that the change-over unit 4 has been extended to include contacts 4A controlling the electromagnets of the braking element 7. In accordance with the invention, the additional units are:

6x, 6y—accumulator of the respective axes,
7x, 7y—braking element of the respective axes.

The accumulator and brake are hereinafter described in more specific detail.

The accumulator 6 can be designed in many ways. It may, for example, be a spring, a spring with an electromagnetic coupling, a claw coupling, an electromagnetic coupling with electromagnets having pronounced pole shoes, and the like.

The braking element, for example 7x, possesses from the transmitter side the character of a securing or locking member preventing any further change of the movable part of the transmitter from the moment of reception of the order from the control part 5xy, until the movable part (1x) reaches the required position in the controlled axis.

Both pairs of elements 6x, 6y, or 7x, 7y may also be united in a single element with the same functional properties, for example in the case of rotational movement of the mechanical input as a claw clutch with a disk secured on the side of the transmitter of the control signals, and the like.

The function of the invention will be explained by means of one of the possible combinations illustrated in FIG. 3 for one axis. In FIG. 3, a drive unit 1 controls the feed of the moving part 1'. A mechanical input represented by a measuring comb or chaser 2a is firmly affixed to the drive unit 1 and the pinion 2b. A transmitter of control signals is represented by a rotary diaphragm 3a, an illumination source 3b, photocells 3c, and stationary diaphragms 3d. A switching or change-over circuit 4, for example, contact relays controlled from a control unit 5, includes contacts 4A for controlling the braking elements and is controlled by the control unit 5. An accumulator comprises a helical spring 6. A braking element comprises an electromagnetic brake 7, controlled by a signal from the control unit 5 through the contacts 4A of the change-over circuit 4.

The contacts 4A are controlled like the contacts 4 from a control unit 5, with the difference that while controlling machine parts in the respective axis, the contacts 4 for the transmitter of this axis are closed (and open for the transmitters of the other axes), whereas the contact of this axis in the circuit 4A is open (and the others are closed) by means of the storage element in circuit 5, activated by the given input instruction about the selection of the axis of movement.

As long as the movable part 1' controlled by the drive unit 1 is in action, the electromagnetic brake is out of engagement or released, and the rotational movement of the pinion is transmitted through a spring 6 directly to the rotary diaphragm or screen 3a. By intermittent screening or unscreening of the light flux produced by the source 3b and impinging on the photocells 3c, electric signals are produced across the outputs of the photocells. The diaphragm or disc 3a, light source 3b and photocells 3c function as the signal transmitter or pulse generator. These signals are supplied through contacts in the change-over circuit 4 to the input of the circuit 5A of the control unit 5 in which they are further transmitted in accordance with the wanted or unwanted direction of the movement in the given axis either to the input of pulses "with a positive meaning" or "with a negative meaning," that is either added to, or substracted from, the instantaneous state of the registers of the control unit. As soon as the required length is reached while the part 1 moves, this length being determined by the respective instruction and expressed by a given number of changes of the electric signals from the photocells 3c, the control unit issues an order for locking the rotary screen 3a by instantaneously cancelling the active state of the predetermined storage element for the given axis of movement. Consequently, by means of the circuit 4, that is by closing the then open contact of the selected axis of movement, the electromagnet of the braking element 7 is excited and this electromagnet becomes operated and thus prevents any further angular movement of the screen 3a. At the same time, the signal output from the photocells 3C is disconnected from the input of the control unit 5 by opening the contact in the change-over circuit 4. Starting from this moment, any angular changes of the position of the pinion 2b are stored by the resilient deformation of the spring of the accumulator 6.

As soon as, after a time of any duration, the instruction for renewed connection of the movable mechanism of the respective axis arrives, the outputs of the photocells 3C are connected through the contacts of the switch 4 to the input of the control unit 5 (5A), and the supply of the braking element 7 is disconnected by opening the contact of the contacts 4A for the respective axis on accordance with the input instructions in the circuit 5. Immediately after release of the braking element 7, any resilient deformation of the spring of the accumulator 6 is equalized so that the rotary screen 3a is moved through an angle corresponding to the angular displacement of the pinion 2b produced while the screen 3a has been locked by the braking element 7. When the screen 3a is rotated, the photocell 3C transmits signals to the control unit 5, and these signals are there added to, or subtracted from, the other signals in accordance with the sense of the deformation of the spring of the accumulator 6. The signals correct the initial state of the control unit 5 by a value proportional to the unwanted displacement of the movable part during the time in which the transmitter of the respective axis was disconnected from the control unit 5.

It is obvious from the preceding specification that the invention has many advantages in comparison with the known state of art, such as:

(1) The braking member which locks the position of the transmitter of the control signal must overcome a moment whose value depends on the design of the accumulator. If the accumulator is properly designed, this moment can be reduced to a value approaching zero. Locking may therefore be accomplished at a speed which is of a higher order than the simultaneous speed of the respective movable part.

(2) With reference to the above point (1), smaller elementary measuring lengths may be selected. Larger feed speeds in moving the machine tool to the required terminal point may also be used, due to the fact than even if this point is exceeded or overrun by the value of one or several elementary feeds, the excess movement is formed in the accumulator and the following digital instruction for the same axis is corrected therewith.

(3) If the moving part of the respective axis of movement is deflected within the limits of mechanical plays between the drive and the movable part proper by external interference forces, this undesirable displacement of the movable part is also registered and corrected as in point (2) above.

(4) The system also registers any other relative change in the position of the mechanical input with respect to the control signal transmitter proper, caused for example by jamming in the guide of the movable part, deformations by unbalance of the movable parts, and the like. The registration of such variations cannot be carried out by any other measure, such as for example strengthening of the movable parts, and the like.

(5) With regard to points (3) and (4), accurate adjustment and definition of the plays and frequent control of the mechanical condition of the machine is not necessary.

(6) The embodiment of the device required only small material costs which practically do not affect the complete initial costs of the control system, although the functional capacity of this device for automatic control is increased.

What we claim is:

1. In a control system for the continous sequential control of the movement of a moving machine part in a coordinate system of at least two coordinates, comprising a moving machine part, a signal transmitter having an input and an output, driving means having an input and an output coupled to said moving machine part for driving said machine part, and control means connected between the output of said signal transmitter and the input of said driving means, energy storage means coupled to and responsive to movement of said machine part; and brake means coupled between said energy storage means and the input of said signal transmitter, said brake means including a brake control connected to and controlled by said control means for selectively energizing said brake means, thereby blocking the transfer of energy from said energy storage means to said signal transmitter so that movement of said machine part causes a corresponding accumulation of energy in said energy storage means and de-energizing said brake means, thereby permitting the transfer of energy from said energy storage means to said signal transmitter so that movement of said machine part causes a corresponding movement of said signal transmitter and the transfer to said signal transmitter of energy accumulated in said energy storage means.

2. In a control system as claimed in claim 1, wherein said energy storage means comprises a helical spring.

3. In a control system as claimed in claim 1, wherein said brake means comprises a brake drum coupled to said signal transmitter and the brake control of said brake means comprises movably mounted brake shoes in operative proximity with said brake drum and control coils on said brake shoes connected to said control means and energized by electrical signals from said control means to move said brake shoes relative to said brake drum.

4. In a control system as claimed in claim 1, wherein said energy storage means comprises a plurality of helical springs, one for each coordinate of said coordinate system.

5. In a control system as claimed in claim 1, wherein said signal transmitter includes a shaft and a disc mounted on said shaft for rotation with said shaft and said energy storage means comprises a helical spring having one end affixed to said shaft and another end coupled to said machine part for movement therewith.

6. In a control system as claimed in claim 5, wherein said brake means comprises a brake drum mounted on the shaft of said signal transmitter for rotation therewith, and the brake control of said brake means comprises movably mounted brake shoes in operative proximity with said brake drum and control coils on said brake shoes connected to said control means and energized by electrical signals from said control means to move said brake shoes relative to said brake drum.

7. In a control system as claimed in claim 1, wherein said signal transmitter includes a plurality of shafts, one for each coordinate of said coordinate system, and a disc mounted on each of said shafts for rotation with the corresponding shaft, and said energy storage means comprises a plurality of helical springs, one for each coordinate of said coordinate system, each having one end affixed to a corresponding one of said shafts and another end coupled to said machine part for movement therewith.

8. In a control system as claimed in claim 7, wherein said brake means comprises a plurality of brake drums, one for each coordinate of said coordinate system, each mounted on a corresponding one of said shafts for rotation therewith and the brake control of said brake means comprises a plurality of movably mounted brake shoes different groups of which are in operative proximity with corresponding ones of said brake drums and control coils on said brake shoes connected to said control means and energized by electrical signals from said control means to move said brake shoes relative to said brake drum.

References Cited
UNITED STATES PATENTS

| | | | |
|---|---|---|---|
| 2,945,167 | 7/1960 | Gunther | 318—28 |
| 3,063,311 | 11/1962 | Beckwith et al. | 318—162 |
| 3,193,744 | 7/1965 | Seward | 318—28 |
| 3,238,430 | 3/1966 | Schuman | 318—162 |
| 3,279,624 | 10/1966 | Devol | 318—162 |

MARTIN P. HARTMAN, *Primary Examiner.*